(12) United States Patent
Abe

(10) Patent No.: US 6,712,384 B2
(45) Date of Patent: Mar. 30, 2004

(54) OCCUPANT PROTECTION DEVICE

(75) Inventor: Kazuhiro Abe, Shiga (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 10/188,895

(22) Filed: Jul. 5, 2002

(65) Prior Publication Data
US 2003/0015861 A1 Jan. 23, 2003

(30) Foreign Application Priority Data

Jul. 23, 2001 (JP) ........................................ 2001-221677

(51) Int. Cl.$^7$ ................................................ B60R 21/22
(52) U.S. Cl. .................................................. 280/730.1
(58) Field of Search .............................. 280/730.1, 732

(56) References Cited

U.S. PATENT DOCUMENTS

| | | | | |
|---|---|---|---|---|
| 2,834,606 A | * | 5/1958 | Bertrand | .................. 280/730.1 |
| 3,414,292 A | * | 12/1968 | Oldberg et al. | .............. 380/740 |
| 3,642,303 A | * | 2/1972 | Irish et al. | ................ 280/730.1 |
| 3,768,830 A | | 10/1973 | Hass | |
| 4,043,572 A | | 8/1977 | Hattori et al. | |
| 4,290,627 A | * | 9/1981 | Cumming et al. | ........... 280/729 |

FOREIGN PATENT DOCUMENTS

JP        410071911 A    *   3/1998          B60R/21/22

* cited by examiner

Primary Examiner—Son T. Nguyen
(74) Attorney, Agent, or Firm—Kanesaka & Takeuchi

(57) ABSTRACT

An occupant protection device for protecting an occupant in a vehicle includes a main airbag arranged to be inflated in front of an upper half body the occupant, and a knee bag arranged below the main airbag to be inflated in front of legs of the occupant. The knee bag has a top end portion positioned at least 50 mm above a bottom end portion of the main airbag when the main airbag and the knee bag are fully expanded.

6 Claims, 3 Drawing Sheets

OCCUPANT PROTECTION DEVICE

BACKGROUND OF THE INVENTION AND RELATED ART STATEMENT

The present invention relates to an occupant protection device for protecting an occupant at the time of a collision of a high-speed moving device, and, more particularly, to an occupant protection device including an airbag and a knee bag.

In order to protect an occupant at the time of an emergency, such as a collision of a vehicle, a driver-seat airbag, a passenger-seat airbag, a leg-protecting knee bag, or the like is provided in the vehicle.

The driver-seat airbag is provided at a steering wheel, and a passenger-seat airbag is primarily provided at an interior panel, such as an instrument panel. The knee bag is provided at, for example, a glove box or an interior panel, disposed in front of legs of the occupant.

The airbag and the knee bag are both covered in a folded state. At the time of an emergency, such as a collision of a vehicle, an inflator supplies gas into the airbag and the knee bag to inflate them. The cover is removed as being pushed by the expanding airbag and the knee bag, so that the airbag and the knee bag expand in front of the occupant.

An object of the present invention is to provide an occupant protection device to adequately protect the occupant by combining an airbag that expands in front of an upper half body of the occupant and a knee bag that expands in front of legs of the occupant.

Another object of the present invention is to provide an occupant protection device to adequately restrict a forward movement of a lumbar part of the occupant by an airbag.

A further object of the present invention is to provide an occupant protection device to restrain the occupant earlier by expanding an airbag in front of the occupant even if an inflator has a small output.

Further objects and advantages of the invention will be apparent from the following description of the invention.

SUMMARY OF THE INVENTION

An occupant protection device of the present invention includes an airbag that expands in front of an upper half body of a seated occupant and a knee bag that expands in front of occupant's legs. A top end of an expanded knee bag is positioned at least 50 mm above a bottom end of an expanded airbag.

In such an occupant protection device, the top end portion of the expanded knee bag and the bottom end portion of the expanded airbag are placed and overlapped at front and back with respect to each other.

Therefore, for example, it is possible to construct the airbag such that the bottom end portion thereof moves into an area between the top end portion of the expanded knee bag and the occupant to restrict the bottom end portion of the airbag from moving back when the occupant pushes the airbag.

As a result, it is possible to adequately restrict a forward movement of the lumbar part of the occupant by the airbag. The space between the top end portion of the expanded knee bag and the occupant is smaller than a space that is provided when the knee bag is not provided. Therefore, by completing the expansion of the knee bag earlier than the expansion of the airbag, even if an inflator for expanding the airbag has a small output, it is possible to restrain the occupant by sufficiently expanding the airbag.

In the present invention, a vent hole may be provided in the knee bag that comes into contact with the expanded airbag. When such a structure is used, it is possible to maintain a gas pressure inside the knee bag at a relatively high value for a long period of time to restrict the gas in the knee bag from flowing out from the vent hole after the vent hole of the knee bag is covered by the airbag. Until the vent hole is covered by the airbag, the gas inside the knee bag flows out from the vent hole, so that a shock exerted on the legs of the occupant is sufficiently absorbed.

DETAILED DESCRIPTION OF PREFERRED EMBODIMENTS

Figure 1:
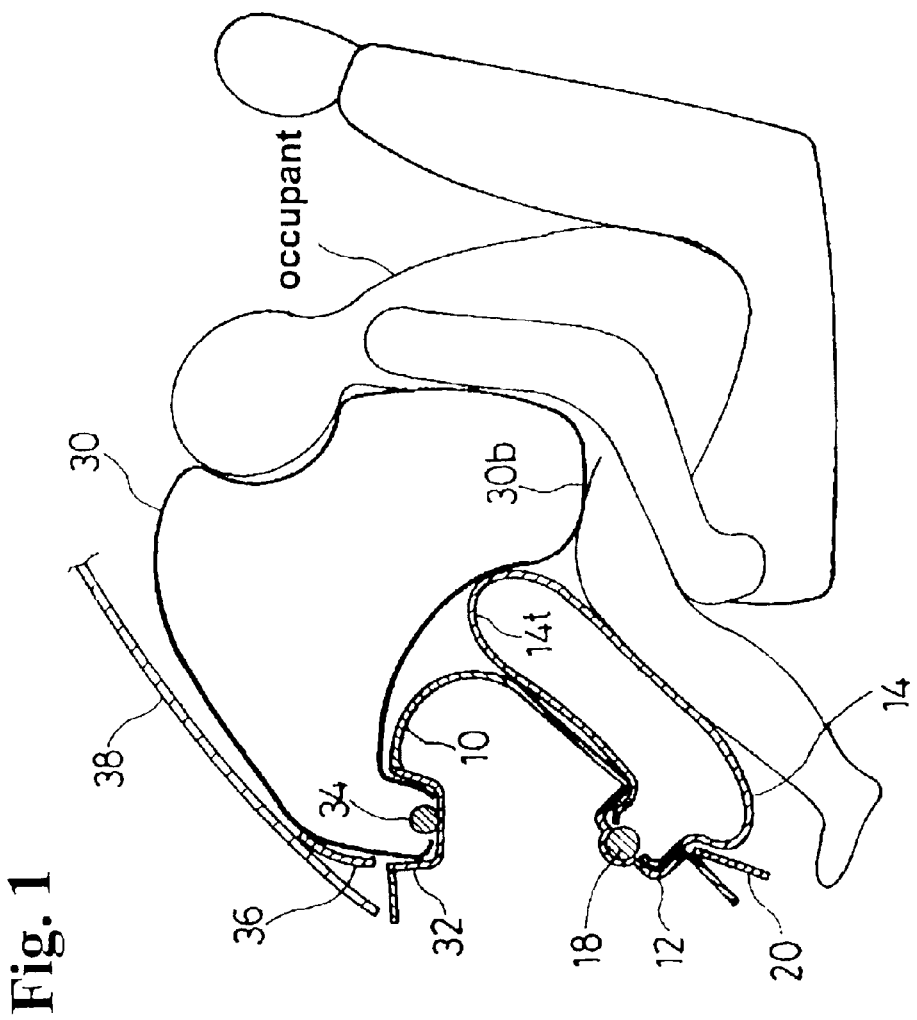
FIG. 1 is a vertical sectional view showing a passenger seat of an automobile including an occupant protection device of an embodiment of the invention.

Hereunder, a description of embodiments of the present invention will be explained with reference to the accompanied drawings. FIG. 1 is a vertical sectional view showing a passenger seat of an automobile including an occupant protection device of an embodiment of the invention. In the embodiment, the occupant protection device includes a passenger-seat airbag and a knee bag to protect an occupant.

A knee-bag case 12 is disposed inside an interior panel 10 (an instrument panel, a lower panel, or the like in the embodiment) in front of a seat in the automobile. A knee bag 14 is accommodated in a folded state inside the case 12, and is fastened to the case 12 by a fastening member. An inflator, i.e. gas generator, 18 for expanding the knee bag 14 is installed inside the case 12. The case 12 has an opening to open along the interior panel 10, and a lid 20 covers the opening.

When the automobile collides, the inflator 18 ejects gas to expand the knee bag 14. Then, the lid 20 starts to open due to a pressure of the expanding knee bag 14. Then, the knee bag 14 is expanded along a front surface portion of the case 12 and the interior panel 10 therearound. The knee bag 14 receives the legs of the occupant and protects them.

The passenger-seat airbag 30 is connected to a container 32 at a peripheral edge of an opening at the back end thereof. The container 32 is disposed in a top surface portion of the interior panel (the instrument panel) 10. An inflator 34 is installed inside the container 32, so that the gas ejected from the inflator 34 is introduced into the airbag 30. The airbag 30 is accommodated in a folded state inside the container 32. A lid 36 is mounted at an opening of the container 32. When the airbag 30 expands, the lid 36 is pushed by the airbag 30 and starts to open towards an inside of the automobile compartment.

In case of emergency, such as a collision of a vehicle, the passenger-seat airbag 30 expands in front of the upper half body of the occupant by the gas ejected from the inflator 34, and the expanded passenger-seat airbag 30 receives the upper half body of the occupant.

When the knee bag 14 and the airbag 30 are both in a completely expanded state (here, it is assumed that there is no occupant), a top end portion 14t of the knee bag 14 is positioned at least 50 mm above a bottom end portion 30b of the airbag 30. A difference in height between the top end portion 14t and the bottom end portion 30b is desirably 50 to 150 mm, and more desirably 60 to 100 mm.

The knee bag 14 expands along the interior panel 10. On the other hand, the airbag 30 first starts to expand upward from the container 32, and, then, expands towards the occupant along a windshield 38. Therefore, the bottom end portion 30b of the passenger-seat airbag 30 expands so as to move into an area between the top end portion 14t of the expanded knee bag and the lumbar part of the occupant. In general, since a capacity of the knee bag 14 is considerably smaller than that of the passenger-seat airbag 30, the knee bag 14 is completed to expand faster than the airbag 30. Therefore, the passenger-seat airbag 30 expands in the area between the top end portion 14t of the knee bag and the occupant's lumbar part by extending around the topside of the top end portion 14t of the expanded knee bag 14.

In this way, since the top end portion 14t is interposed between the bottom end portion 30b of the passenger-seat airbag 30 and the interior panel (the instrument panel) 10, when the occupant's lumbar part or abdomen strikes the bottom portion of the airbag 30, retreating movement of the bottom portion of the airbag is restricted by the knee bag 14, so that, for example, the occupant's lumbar part is very adequately protected. Since it is not necessary to fully fill the gas in an area of the passenger-seat airbag 30 located near the top portion of the knee bag 14, the passenger-seat airbag 30 can accordingly be made smaller in capacity than a conventional airbag. Therefore, even if the inflator has a small output, the airbag 30 expands adequately at an early stage in front of the occupant.

The inflator 18 for the knee bag may be actuated or ignited earlier than the inflator 34 for the airbag. In such a case, it is possible to complete the expansion of the knee bag 14 earlier.

Figure 2:
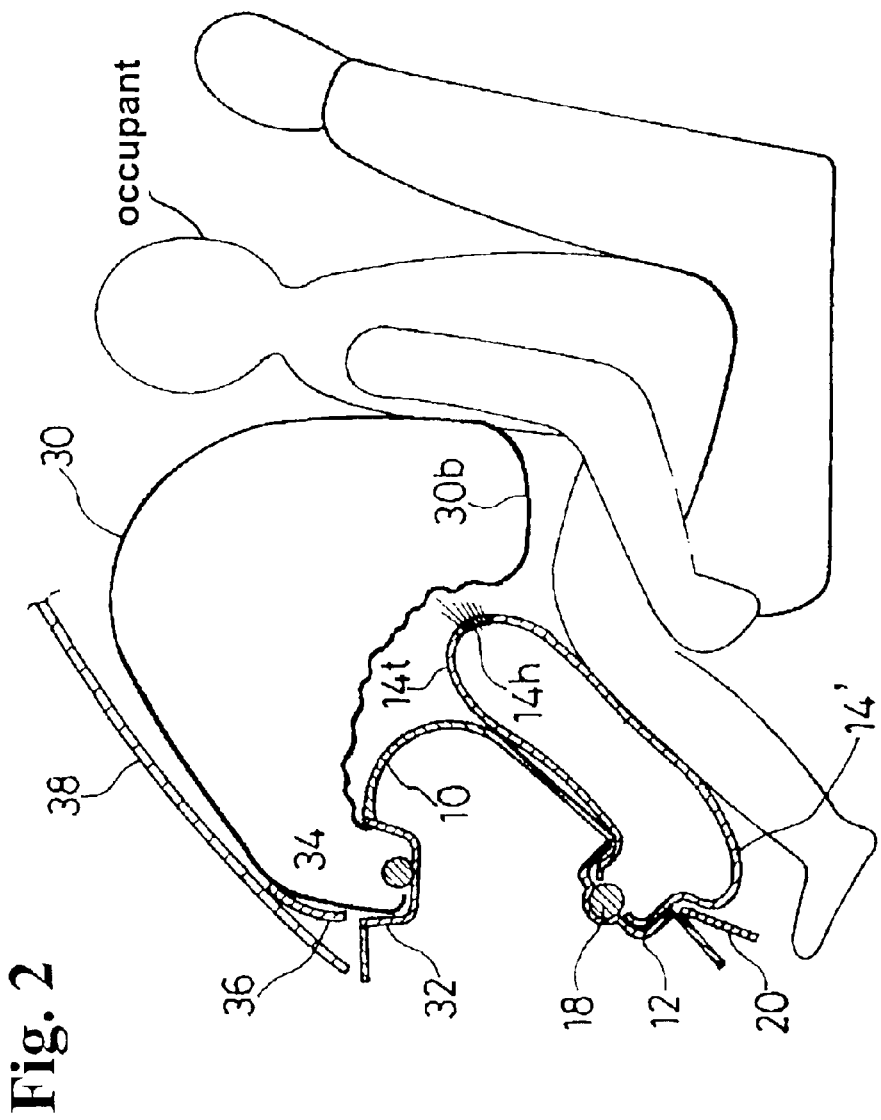
FIG. 2 is a sectional view showing a passenger seat of an automobile including an occupant protection device of another embodiment of the invention.

In the present invention, as shown in FIG. 2, a vent hole 14h may be provided in a surface of the top end portion of a knee bag 14' that comes into contact with an airbag 30 when both the knee bag 14' and the airbag 30 have been completed to expand. In this case, when the legs of the occupant hit the expanded knee bag 14', at an initial stage (as shown in FIG. 2) where the vent hole 14h is not covered by the airbag 30, gas inside the knee bag 14' smoothly flows out from the vent hole 14h, so that shock exerted on the occupant is absorbed. Thereafter, the vent hole 14h is covered by the expanded passenger-seat airbag 30, as shown in FIG. 1. As a result, the gas is restricted from flowing out from the vent hole 14h, so that the internal pressure of the knee bag 14' is maintained at a predetermined value for a long period of time, thereby making it possible to very adequately protect the occupant's legs.

Other structural features shown in FIG. 2 are the same as those shown in FIG. 1, so that the same reference numerals represent corresponding parts.

Figure 3:
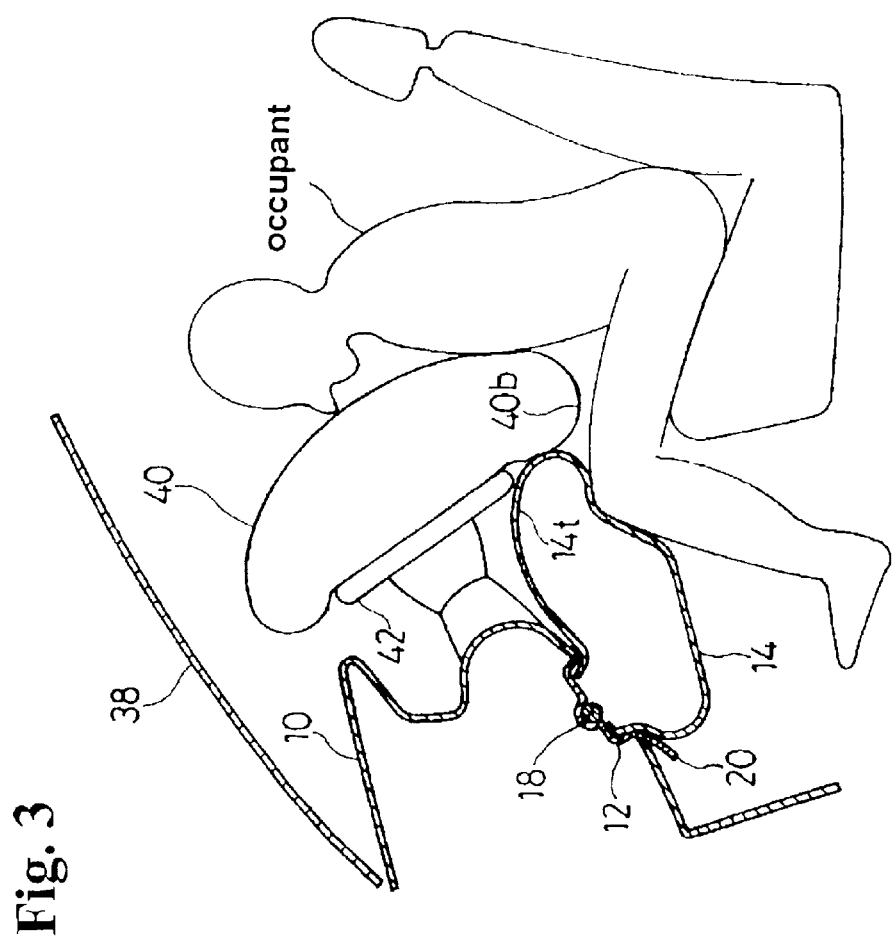
FIG. 3 is a vertical sectional view showing a driver's seat of an automobile including an occupant protection device.

FIG. 3 is a vertical sectional view showing a driver's seat of an automobile including an occupant protection device for protecting an occupant by a driver-seat airbag 40 and a knee bag 14.

The driver-seat airbag 40 is mounted to a retainer (not shown) installed near the center of a steering wheel 42. A module cover (not shown) covers the airbag in a folded state. In case of a collision of a vehicle, when an inflator (not shown) operates to expand the airbag 40, the module cover is split for the airbag 40 to expand in front of the occupant.

Other structural features of a knee bag device including the knee bag 14 are the same as those shown in FIGS. 1 and 2, and the same reference numerals represent corresponding parts. When the inflator 18 is actuated, the knee bag 14 expands along an interior panel 10, and towards a vicinity of the bottom side of the steering wheel 42. When there is no occupant, a top end portion 14t of the expanded knee bag 14 is positioned above a bottom end portion 40b of the expanded airbag 40 by at least 50 mm; desirably, 50 to 150 mm; and, most desirably, 60 to 100 mm.

In this embodiment, since a portion of the knee bag 14 near the top end thereof supports a back portion of the airbag 40 near the bottom end portion thereof from the front side of the vehicle, when the occupant hits the bottom portion of the airbag 40, a backward movement of the bottom portion of the airbag 40 is restricted. In the embodiment shown in FIG. 3, the knee bag 14' may include a vent hole at the Lop portion of the knee bag that comes into contact with the airbag 40 during expansion thereof.

The above-described occupant protection devices are only embodiments of the present invention, and the present invention is not limited thereto. For example, the knee bag and the passenger-seat airbag may be disposed at locations other than those shown in the figures. The present invention may be applied to a combination of a knee bag and a rear-seat airbag.

As shown from the aforementioned description, according to the present invention, it is possible to adequately protect the occupant by combining, for example, the passenger-seat airbag that expands in front of the upper half body of the occupant, the driver-seat airbag, or the back-seat airbag and the knee airbag that expands in front of the occupant's legs. According to the present invention, it is possible to adequately restrict forward movement of the occupant's lumbar part. Further, according to the present invention, it is possible to construct the occupant protection device so that the airbag expands at an early stage in front of the occupant even if the inflator has a small output.

While the invention has been explained with reference to the specific embodiments of the invention, the explanation is illustrative and the invention is limited only by the appended claims.

What is claimed is:

1. An occupant protection device for protecting an occupant in a vehicle, comprising:
   a main airbag arranged to be inflated in front of an upper part of the occupant and having a bottom end portion, and
   a knee bag arranged under the main airbag to be inflated in front of legs of the occupant and formed separately from the main airbag without communication thereto, said knee bag partly overlapping the main airbag and having a top end portion positioned at least 50 mm above the bottom end portion of the main airbag when the main airbag and the knee bag are fully expanded.

2. An occupant protection device according to claim 1, wherein said bottom end portion of the main airbag is positioned over the top end portion of the knee bag to be located close to the occupant when the main airbag and the knee bag are fully expanded.

3. An occupant protection device according to claim 2, wherein said knee bag completes expansion thereof at a stage earlier than the main airbag.

4. An occupant protection device according to claim 2, wherein said knee bag includes a vent hole at a position facing the main airbag.

5. An occupant protection device according to claim 1, further comprising a first inflator for inflating the main airbag, and a second inflator formed separately from the first inflator for inflating the knee bag.

6. An occupant protection device according to claim 5, further comprising a knee-bag case for accommodating the second inflator and the knee-bag in a folded state, said top end portion extending upwardly from the knee-bag case when the second inflator is actuated.

* * * * *